United States Patent [19]
Hite et al.

[11] Patent Number: 5,605,741
[45] Date of Patent: Feb. 25, 1997

[54] HYBRID FACE COATING FOR PISTON RING

[75] Inventors: Russell E. Hite, Richmond, Ind.; Ihor R. Maksymiak, Toledo, Ohio; Michael A. Kestner, Richmond, Ind.

[73] Assignee: Dana Corporation, Toledo, Ohio

[21] Appl. No.: 459,072

[22] Filed: Jun. 2, 1995

(Under 37 CFR 1.47)

[51] Int. Cl.⁶ .................................................. F16J 9/26
[52] U.S. Cl. ............. 428/216; 277/235 A; 277/DIG. 6; 428/212; 428/182; 428/179; 428/336; 428/469; 428/698
[58] Field of Search ................................ 428/469, 698, 428/216, 212, 336, 472, 217, 179, 182; 277/235 A, DIG. 6

[56] References Cited

U.S. PATENT DOCUMENTS

| | | | |
|---|---|---|---|
| 3,857,682 | 12/1974 | White | 29/195 |
| 4,570,946 | 2/1986 | Tsuchiya et al. | 277/216 |
| 4,619,865 | 10/1986 | Keem et al. | 428/333 |
| 4,966,751 | 10/1990 | Kaede et al. | 420/34 |
| 4,985,092 | 1/1991 | Kaede et al. | 148/326 |
| 5,104,132 | 4/1992 | Oneda et al. | 277/236 |
| 5,154,433 | 10/1992 | Naruse | 277/235 |
| 5,226,975 | 7/1993 | Denton et al. | 148/220 |
| 5,241,748 | 9/1993 | Ishida | 29/888.074 |
| 5,316,321 | 5/1994 | Ishida et al. | 277/235 |

FOREIGN PATENT DOCUMENTS

| | | |
|---|---|---|
| 60-108551 | 4/1985 | Japan. |
| 62-188856 | 3/1987 | Japan. |
| 62-120471 | 6/1987 | Japan. |
| 6441650 | 8/1987 | Japan. |
| 91091747 | 5/1989 | Japan. |
| 1-52471 | 11/1989 | Japan. |
| 464 | 1/1992 | Japan. |
| 22431162 | 10/1991 | United Kingdom. |
| 2257771 | 1/1993 | United Kingdom. |

OTHER PUBLICATIONS

Wang et al "The Morphology and Orientation of G–N films deposited by reactive ion plating" Thin Solid Films 185(1990) Mar., No. 2 pp. 219–230.
English Translation of Japanese Application No. 4–64.
English Translation of Japanese Application No. 64–41650.

*Primary Examiner*—Archene Turner
*Attorney, Agent, or Firm*—Rader, Fishman & Grauer

[57] ABSTRACT

A base body of a piston ring has an electroplated chrome or gas nitrided sub-layer formed on its outer peripheral face. The sub-layer is face-lapped, roughened through grit blasting, and then oil lapped to remove the asperities. The resulting plateau-reservoir surface has a smooth plateau and a number of reservoirs. A metallic nitride face coating is applied to the sub-layer. The reservoirs provide additional surface area to promote the bonding between the metallic nitride and the sub-layer. The coating does not eliminate the reservoirs, however. Thus, the reservoirs provide the additional function of storing lubricating oil which may be used during piston ring operation to eliminated unwanted wear.

16 Claims, 2 Drawing Sheets

HYBRID FACE COATING FOR PISTON RING

FIELD OF THE INVENTION

The present invention relates to a piston ring, and more particularly to a ring having a sub-layer applied to an outer peripheral surface of the ring, a discontinuous surface formed on the sub-layer with a metallic nitrided face coating applied to the discontinuous surface.

BACKGROUND OF THE INVENTION

It is known to form a gas nitrided layer on a piston ring as a base for a metallic nitride face coating. The face coatings complement the hard gas nitrided layer by providing advantages not possessed by the gas nitrided layer, such as strong scuff resistance and extremely high hardness.

Yet, the desirable advantages offered by metallic nitride face coatings result in unwanted side effects. The coatings are particularly prone to chipping and may not achieve suitable coating thickness if they lack sufficiently strong bonds with an underlying substrate. Even if a suitable substrate is provided, however, there is often insufficient surface area between the coating and the substrate to promote the necessary bonds.

The lack of porosity and very high strength results in increased friction between the face coating and a mating mechanical element such as a cylinder wall. Metallic nitride face coatings lack the inherent ability of oil retention. Therefore, they cannot provide a critical source of lubrication during periods when boundary layer lubrication is required and to enhance scuff resistance during piston ring break in.

SUMMARY OF THE INVENTION

A base body of a disclosed piston ring has a sub-layer formed on at least an outer peripheral face of the base body. The sub-layer is preferably electroplated chrome or formed from a gas nitride. The sub-layer has a hardness between 800 and 950 Hardness Vickers Number ("HVN") and a minimum thickness of 0.004 inches. (0.101 mm). A plateau-reservoir surface is formed on the sub-layer. First, the sub-layer is face lapped to provide more uniform line contact with a mating cylinder wall and to produce an optional convex surface profile. Then, the sub-layer is roughened through grit-blasting to create randomly oriented surface irregularities that include a series of crevices which will ultimately serve as reservoirs for lubricant. Finally, the sub-layer is oil lapped and optionally polished to remove asperities formed during the roughening process, creating a plateau.

A metallic nitride face coating is applied to the plateau-reservoir surface, the face coating having a convex surface profile. The metallic nitride face coating has a hardness of 2000 to 3000 HVN and a thickness of 1 to 50 microns. Preferably, the face coating has a thickness of approximately 4 to 10 microns and a hardness of approximately 2600 HVN. Preferred metallic nitrides include chromium or titanium nitride. The smooth plateau works in combination with the additional surface area available from the reservoirs to provide an optimal substrate for bonding the metallic nitride to the sub-layer. The addition of the face coating does not eliminate the existence of the reservoirs, however. The reservoirs have the important additional ability of storing lubricating oil during engine operation. The reservoirs work in combination with the convex surface profile to provide a thin lubricating layer which prevents unwanted wear between the piston ring and a corresponding cylinder wall during periods of boundary layer lubrication.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figures 1, 2, 3:
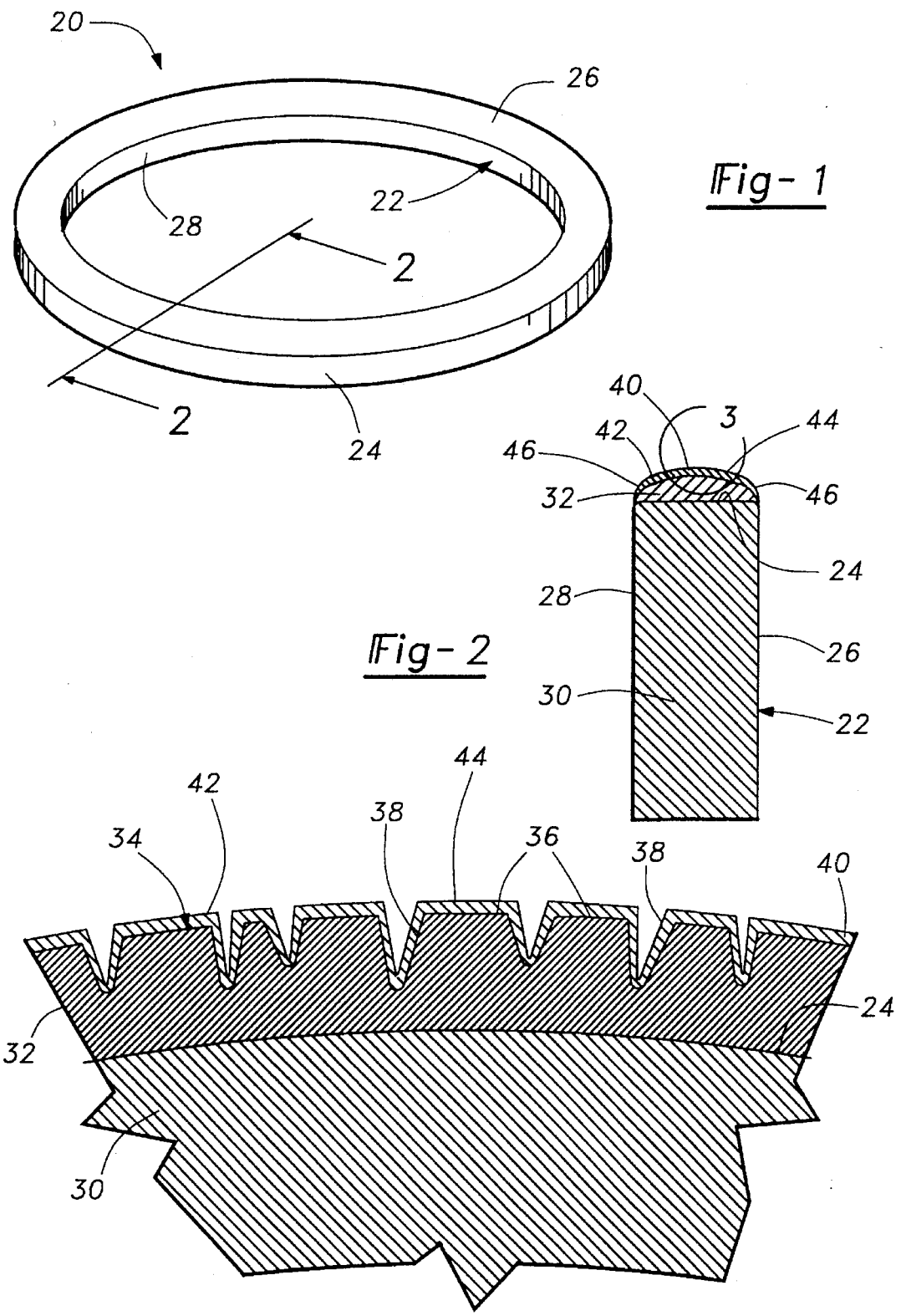
FIG. 1 is a perspective view of a piston ring incorporating the present invention.
FIG. 2 is a cross-sectional view of the piston ring shown in FIG. 1 viewed in the direction of arrows 2—2.
FIG. 3 is an enlarged cross-sectional view of a portion of the piston ring within the encircled region 3 of FIG. 2.

A piston ring 20 is shown in FIG. 1 having an outer surface 22 which includes an outer peripheral face 24, an upper axial surface 26 and a lower axial surface 28. In use, outer peripheral face 24 contacts an inner wall of a cylinder(not shown).

As illustrated in FIG. 2, piston ring 20 includes a base body 30 which may be formed from cast iron, ductile iron, or a steel alloy. A preferred steel alloy is a martensitic stainless steel having between 10 and 20 percent chromium by weight and between 0.20 and 0.90 percent carbon by weight. A sub-layer 32 is formed on outer surface 22, and at least applied to outer peripheral face 24. Sub-layer 32 has a preferred hardness of 800 to 950 Hardness Vickers Number ("HVN") and a minimum preferred case depth or thickness of 0.004 inches. (0.101 mm). Preferably, sub-layer 32 comprises chrome electroplated in a typical manner, as understood by an individual skilled in the art. Alternatively, a gas nitride sub-layer may be applied. A preferred method for forming sub-layer 32 using gas nitriding involves placing body 30 in an ammonia-nitrogen atmosphere furnace operating between 930 and 1050° F (499° and 566° C.).

After sub-layer 32 is formed, the sub-layer is preferably face lapped to provide a more uniform line of contact with a mating cylinder wall (not shown) and to produce an optional convex surface profile, as discussed in greater detail below. Face lapping is a process involving the use of a metal lap which is run over the relevant surfaces. Face lapping, however, typically involves the formation of vertical striations or channels between surfaces 26 and 28 which allow oil to escape from piston ring 20.

Once face lapping is completed, a plateau-reservoir surface 34 is formed in the sub-layer. As illustrated in FIG. 3, plateau-reservoir surface 34 comprises a generally smooth upper plateau 36 and a series of randomly oriented crevices 38 extending various depths into sub-layer 32 from plateau 36.

Figure 4:
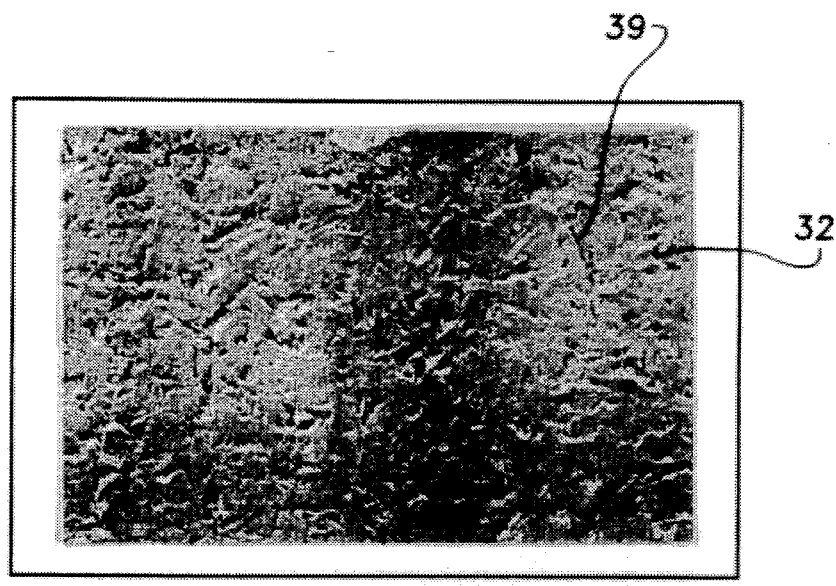
FIG. 4 is an enlarged picture of a sub-layer formed according to the present invention.

A preferred means for forming plateau-reservoir surface 34 involves roughening sub-layer 32 to create randomly oriented surface irregularities which include reservoirs 38. Typically, sub-layer 32 is roughened by grit blasting using 80 to 120 grit aluminum oxide to form a pocked surface. An actual example of such a surface is illustrated in FIG. 4 which shows sub-layer 32 at 100 times magnification after grit blasting. Unlike the vertical striations produced by face lapping, reservoirs 38 are closed to prevent the dissipation of lubricant from oil ring 20 by trapping it. There is no ready avenue of escape for the oil. The grit blasting is controlled so that reservoirs 38 do not extend through the entire case depth of sub-layer 32. Otherwise, the sub-layer may be unduly weakened which could result in unwanted chipping or spalling. The depth must be sufficient, however, to remove the vertical channels formed during face lapping. The remnant of one such channel 39 is shown in FIG. 4. Reservoir depths of as little as 2 to 5 microns have been found to be sufficient to provide boundary layer lubrication and enhanced scuff resistance.

After grit blasting, sub-layer 32 is oil lapped to remove asperities formed during the roughening process, creating plateau 36. For sub-layer 32 to provide an optimum substrate, plateau 36 must be extremely smooth. Therefore, an additional polishing step may be required. Nevertheless, sub-layer 32 is preferably maintained at its original hardness after roughening and oil lapping or polishing.

Once plateau-reservoir surface 34 is formed in sublayer 32, a metallic nitride face coating 40 is applied to surface 34. Coating 40 has a preferred hardness of 2000 to 3000 HVN and more preferably approximately 2600 HVN. Coating 40 also includes a case depth or thickness of 1 to 50 microns and more particularly an approximate thickness of 4 to 10 microns. Face coating 40 should have little or no porosity, a low coefficient of friction, high hardness and strong scuff resistance.

While metallic nitride face coatings provide numerous advantages, they are particularly prone to chipping. Sub-layer 32 acts as a very hard substrate to prevent chipping of coating 40. A smooth plateau 36 in combination with the additional surface area available from reservoirs 38 provides an optimal substrate for bonding facing coating 40 to sub-layer 32 without interfering with piston ring operation.

As illustrated in FIG. 3, however, the addition of face coating 40 does not eliminate the existence of reservoirs 38. Reservoirs 38 have the important ability to store lubricating oil during engine operation. Reservoirs provide a critical source of oil during periods when boundary layer lubrication is required, and enhance piston ring break-in scuff resistance.

A preferred face coating 40 comprises either titanium nitride or chromium nitride. Each of these metallic nitrides has a high bond strength with sub-layer 32 resulting from the method of coating formation, described below. In particular, a chromium nitride face coating has low internal stress, which resists chipping and allows greater coating thickness. Further, chromium nitride has excellent compatibility when bonded with a sub-layer 32 formed from electroplated chrome.

In general, the metallic nitride is formed using a metallic source such as chromium or titanium which is evaporated to produce a metallic vapor in a zone between the metallic source and sub-layer 32. Then a nitrogen containing gas is introduced into the zone. The gas reacts with the metallic vapor to form a metallic nitride with metallurgically tight bonds. The metallic nitride is then deposited onto plateau-reservoir surface 34 to create the metallic nitride face coating 40. Metallic nitride face coating 40 has no porosity, and none of the interstitial spaces present when using a plasma applied face coating.

More specifically, face coating 40 may be applied through the use of an electroplating process called "Arc Physical Vapor Deposition." Body 30, with sub-layer 32 and its plateau-reservoir surface 34, is placed in a vacuum furnace. Polarity is established between a plating metal such as chromium or titanium and base body 30. Base body 30 acts as a negatively charged cathode and the plating metal acts as a positively charged anode. The vaporized plating metal interacts with a reactive gas containing nitrogen to form a metallic nitride which is then deposited onto plateau-reservoir surface 34. Chromium and titanium have been found to be particularly good plating metals since their use result in a metallic nitride coating of the desired thickness. In practice approximately 10 microns of face coating 36 may be produced an hour. Physical deposition using this approach requires approximately 100 amps with a voltage differential of approximately 20 volts. The temperature of base body 26 should not exceed 800° F.

Once face coating 40 is applied to plateau-reservoir surface 34, a resulting outer surface 42 preferably has a convex surface profile between 0.0005 and 0.001 inches (0.013 mm and 0.03 mm) as measured between an apex 44 of the surface and either a lower or upper transition point 46 defined between outer surface 42 and the corresponding axial surfaces 26 and 28. A convex surface profile promotes the storing of lubricating oil in reservoirs 38 and the selective use of the oil to create a thin lubricating layer between ring 20 and a corresponding cylinder wall. The lubricating layer prevents unwanted wear between ring 20 and a corresponding cylinder wall during periods of boundary layer lubrication and enhances piston ring break-in resistance.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A piston ring comprising:
    a generally annular base body having an upper peripheral face, an upper surface, and a lower surface;
    a sub-layer applied to said peripheral face, said sub-layer having a pocketed surface with randomly oriented reservoirs that are closed between said upper surface and lower surface; and
    a metallic nitrided face coating applied to said pocketed surface.

2. A piston ring as recited in claim 1, wherein said pocked surface is formed by the process of grit blasting followed by oil lapping.

3. A piston ring as recited in claim 2, wherein said pocked surface is formed by the process of face lapping before said grit blasting.

4. A piston ring as recited in claim 1, wherein said reservoirs have a depth of at least 2 microns.

5. A piston ring as recited in claim 2, wherein said grit blasting requires material 80 to 120 grit.

6. A piston ring as recited in claim 1, wherein said sub-layer has a hardness between 800 and 950 HVN and a minimum thickness of 0,004 inches.

7. A piston ring as recited in claim 6, wherein said sub-layer comprises one of an electroplated chrome and a gas nitride.

8. A piston ring as recited in claim 1, wherein said metallic nitride face coating has a hardness of 2000 to 3000 HVN and a thickness of 1 to 50 microns.

9. A piston ring as recited in claim 8, wherein said thickness of said metallic nitride face coating is approximately 4 to 10 microns.

10. A piston ring as recited in claim 8, wherein said metallic face coating comprises one of chromium nitride and titanium nitride.

11. A piston ring as recited in claim 10, wherein said metallic nitride face coating is applied by physical vapor deposition.

12. A piston ring comprising:
- a generally annular base body having an outer peripheral face;
- a sub-layer of one of electroplated chrome and gas nitride applied to said peripheral face, said sub-layer having a plateau-reservoir surface formed by grit blasting followed by oil lapping, said sub-layer having a hardness of 800 to 950 HVN and a minimum thickness of 0.004 inches;
- a metallic nitrided face coating of one of chromium nitride and titanium nitride applied to said plateau-reservoir surface, an outer peripheral surface of said metallic face coating having a convex surface profile of 0.0005 to 0.001 inches, said metallic nitride face coating having a hardness of 2000 to 3000 HVN and a thickness of 1 to 50 microns.

13. A piston ring as recited in claim 12, wherein said plateau-reservoir surface includes the process of face lapping before said grit blasting.

14. A piston ring as recited in claim 12, wherein said metallic nitride face coating has an approximate thickness of 4 to 10 microns.

15. A piston ring as recited in claim 12, wherein said metallic nitride face coating has an approximate hardness of 2600 HVN.

16. A piston ring as recited in claim 12, wherein between 80 and 120 grit aluminum oxide is used for said grit blasting.

* * * * *